(12) United States Patent
Cassidy

(10) Patent No.: US 6,206,654 B1
(45) Date of Patent: Mar. 27, 2001

(54) AIR MATTRESS INFLATION APPARATUS

(75) Inventor: Daniel G. Cassidy, Findlay, OH (US)

(73) Assignee: DLM Plastics Corporation, Findlay, OH (US)

( * ) Notice: Subject to any disclaimer, the term of this patent is extended or adjusted under 35 U.S.C. 154(b) by 0 days.

(21) Appl. No.: 09/292,645

(22) Filed: Apr. 15, 1999

(51) Int. Cl.⁷ .................................................. F04B 39/00
(52) U.S. Cl. ................................................. 417/312; 5/713
(58) Field of Search ..................... 417/350, 312, 417/412, 413.1, 473, 304, 313; 5/706, 708, 713; 137/116.3

(56) References Cited

U.S. PATENT DOCUMENTS

| | | | |
|---|---|---|---|
| 3,799,703 | * | 3/1974 | Paine et al. ............................ 417/312 |
| 4,312,421 | * | 1/1982 | Pioch .................................... 181/202 |
| 4,394,784 | * | 7/1983 | Swenson et al. ......................... 5/710 |
| 4,644,597 | * | 2/1987 | Walker ..................................... 5/711 |
| 4,829,616 | * | 5/1989 | Walker ..................................... 5/713 |
| 4,890,344 | * | 1/1990 | Walker ..................................... 5/713 |
| 4,892,413 | * | 1/1990 | Vats ...................................... 366/349 |
| 4,897,890 | * | 2/1990 | Walker ..................................... 5/713 |
| 4,982,466 | * | 1/1991 | Higgins et al. ........................... 5/453 |
| 4,986,738 | * | 1/1991 | Kawasaki et al. ..................... 417/304 |
| 5,423,395 | * | 6/1995 | Kieffer ................................. 181/202 |
| 5,558,492 | * | 9/1996 | Kieffer ................................. 415/119 |
| 5,588,811 | * | 12/1996 | Price .................................... 417/350 |
| 5,606,756 | * | 3/1997 | Price ....................................... 5/713 |
| 5,944,494 | * | 8/1999 | Soltani et al. ........................ 417/312 |

OTHER PUBLICATIONS

Pages from Halcyon Waterspring, Inc. entitled "Air Water Foam", dated Jul. 10, 1998. Pages from Select Comfort, Knoxville, TN, entitled "Modern Sleep", dated spring/summer 1999. Pages from Select Comfort, Minneapolis, MN, entitled "Introducting a Revolutionary New Way to Improve Your Sleep".

* cited by examiner

Primary Examiner—Teresa Walberg
Assistant Examiner—Jeffrey C Pwu
(74) Attorney, Agent, or Firm—Brinks Hofer Gilson & Lione

(57) ABSTRACT

An air mattress inflator/deflator assembly includes a cylindrical housing which contains a device for pressurizing the housing, generally a blower and motor. The blower is located near one end of the housing, and pressurizes its interior. One or more valves are selectively operable to direct the pressurized air in the housing to tubing which communicates with an air mattress. The internal pressure of the air mattress can be increased by activating the motor and blower and a valve, pressurizing the housing and directing pressurized air to the air mattress. The internal pressure of the air mattress can be decreased by activating a valve, and releasing air in the air mattress through the housing and out to the ambient. A closed cell foam block surrounds the housing and an intake muffler both reduce operating noise levels.

20 Claims, 3 Drawing Sheets

AIR MATTRESS INFLATION APPARATUS

BACKGROUND OF THE INVENTION

The invention relates generally to an assembly for inflating and deflating air mattresses and more specifically to an air mattress inflator/deflator assembly which provides controlled inflation and deflation of an associated air mattress and generates minimal noise during operation.

Mattresses have evolved through the years much as many other consumer products. Decades ago a standard mattress comprised metal springs with layers of padding over the springs.

From about 1970 to 1980, interest in water filled mattresses peaked. While they are still popular, many consumers consider their relatively great weight and immovability to be an inconvenience. These characteristics also often make them unwelcome in rental and lease properties. In addition to weight and immovability issues, though small, there is also the possibility that they will leak.

Water mattresses underwent significant change during their popularity. Early water mattresses included nothing more than an envelope or outer skin which contained, but did not control, wave motion of the water. Many users found the undamped motion of the water unpleasant. The industry responded with various products which, to a greater or lesser extent, damped such uncontrolled wave motion. Such products included air filled tubes, baffles extending between the top and bottom panels and fiber inserts, to name but three.

Air mattresses which comprise a bladder or envelope filled with air under low pressure now enjoy popularity. Such air mattresses provide obvious benefits relative to a water mattress: significantly lower weight, portability and, though not leak proof, suffer leaks which are far less problematic than water leaks.

Another benefit of such mattresses is their ability to be inflated or deflated to suit the personal preference of a user. Devices are available which are selectively controllable by the user to add or release air from the mattress and adjust its firmness. However, they generate excessive and unpleasant sound levels when operating. Such high sound levels are particularly unpleasant when it is noted that such inflating apparatus will most frequently be operated at night when it is relatively quiet. Thus, in a relative sense, while the sound levels of such devices might not be objectionable when used during the day with typically daytime ambient sound levels, during the night, in a bedroom, the high sound levels generated can be noticeable and decidedly unpleasant.

The present invention is directed to providing an air mattress inflator/deflator assembly which addresses the problem of high operating sound levels common to prior art inflator/deflator assemblies.

SUMMARY OF THE INVENTION

An air mattress inflator/deflator assembly includes a cylindrical housing which contains a device for pressurizing the housing, generally a blower and motor. The blower is located near one end of the housing, and pressurizes its interior. One or more valves are selectively operable to direct the pressurized air in the housing to tubing which communicates with an air mattress. The internal pressure of the air mattress can be increased by activating the motor and blower and a valve, pressurizing the housing and directing pressurized air to the air mattress. The internal pressure of the air mattress can be decreased by activating a valve, and releasing air in the air mattress through the housing and out to the ambient.

To provide an inflator/deflator assembly for an inflatable mattress that can be easily located beneath a bed or in close proximity thereto, it is necessary to keep the size of the assembly to a minimum. Consequently, the motor and blower are relatively small, and operate at high speed to provide the necessary differential pressure and volume for effective and acceptably rapid inflation of the mattress. A significant drawback of high-speed operation is noise.

The present invention reduces the noise associated with operation of the inflator/deflator assembly by enclosing the motor and blower inside a cylindrical housing, and disposing the housing into a close fitting closed cell foam block or surround. The cylindrical shape of the housing eliminates planar surfaces which might sympathetically vibrate and augment noise from operation of the motor and fan. The closed cell foam surround both damps vibration of the housing and suppresses transmission of noise from the housing to the outside environment. The blower draws in ambient air through a sintered metal intake muffler.

Thus it is an object of this invention to provide an air mattress inflator/deflator assembly having a housing without flat surfaces that can sympathetically vibrate and transmit noise and vibration from the motor and blower to the ambient.

It is a further object of the present invention to provide an air mattress inflator/deflator assembly having a circular housing contained within a foam surround which minimizes noise transmission to the ambient while the assembly is operating.

It is a still further object of the present invention to provide an air mattress inflator/deflator assembly having an intake muffler disposed adjacent a blower which produces transmission of operating noise to the ambient.

It is a still further object of this invention to provide a quiet air mattress inflation/deflation device that can be used to independently control the air pressure in a single or multiple chamber air mattress.

Further objects and advantages of the present invention will become apparent by reference to the following description of the preferred embodiment and appended drawings wherein like numbers refer to the same component, element or feature.

DESCRIPTION OF THE PREFERRED EMBODIMENT

Figure 1:
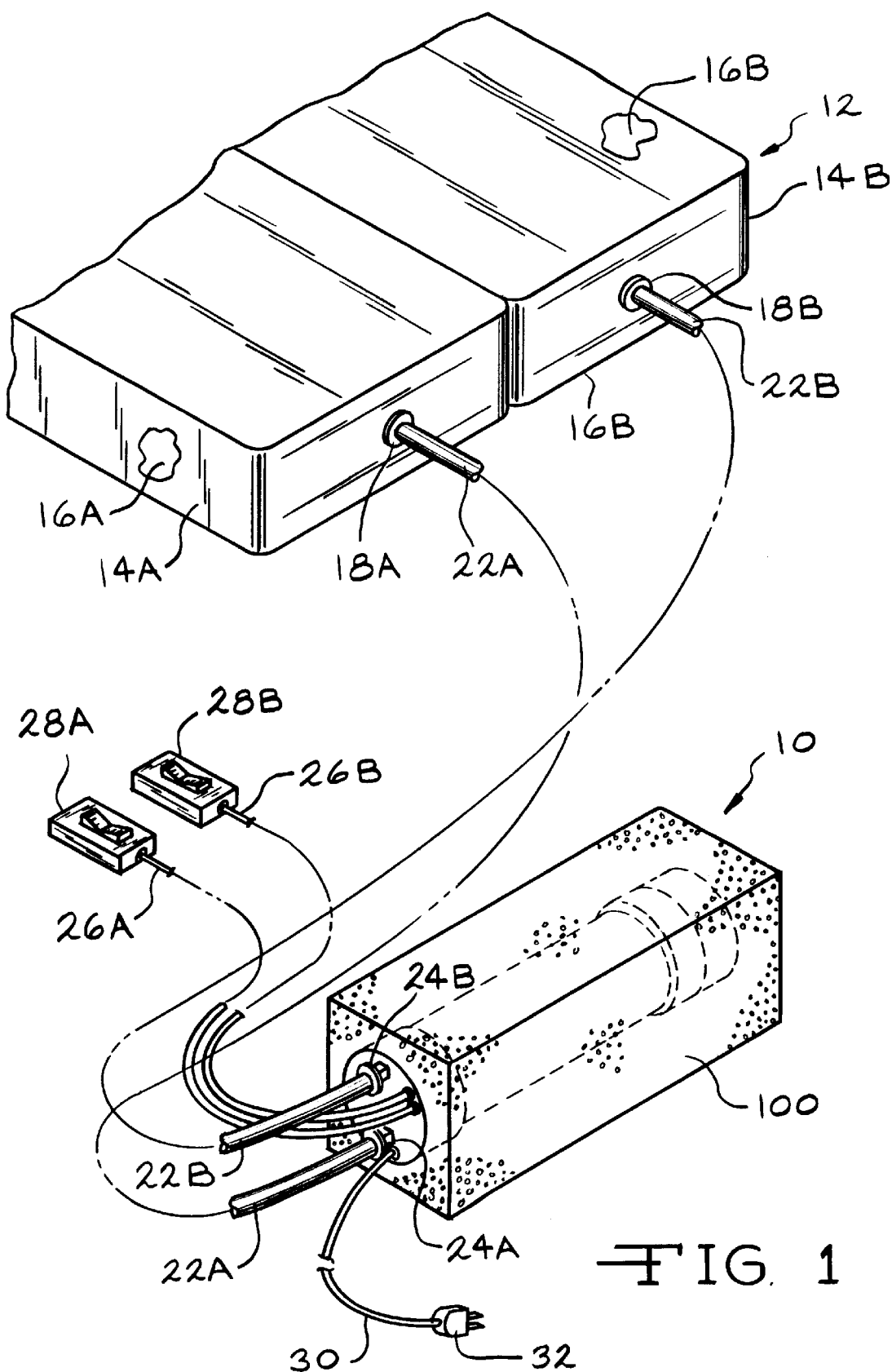
FIG. 1 is an perspective view of an air mattress and inflator/deflator assembly according to the present invention.

Referring to FIG. 1, an air mattress inflator assembly is illustrated and designated by the reference number 10.

The air mattress inflator/deflator assembly 10 is typically used in conjunction with an air mattress assembly 12 which preferably includes a pair of flexible plastic, typically vinyl, envelopes or bladders 14A and 14B which define respective adjacent chambers 16A and 16B. On a suitable surface such as a side or end wall of each of the bladders 14A and 14B is a respective access fitting 18A and 18B which receives and provides communication to a flexible length of hose or tubing 22A and 22B. It will be appreciated that the air inflator/deflator assembly 10, with suitable modifications, may be utilized with an air mattress 12 having a single chamber or an air mattress having 4, 6 or more chambers.

Each of the lengths of tubing 22A and 22B are terminated in a similar access fitting 24A and 24B secured to the inflator/deflator assembly 10. The access fittings 18A and 18B and 24A and 24B may define relatively permanently connected devices and include a strap type clamp or may define more readily removable quick connects, e.g., bayonet style latch connectors. Alternatively, the lengths of hose or tubing 22A and 22B may be relatively permanently secured at one end to the access fittings 18A and 18B or 24A and 24B and include quick disconnect fittings at their opposite end. Also extending from the inflator/deflator assembly 10 are a pair of multi-conductor electrical cables 26A and 26B which terminate at a like pair of multiple position, momentary contact switches 28A and 28B. The switches 28A and 28B are preferably disposed adjacent the respective sides of the mattress assembly 12 within easy reach of the users. Finally, a conventional AC power cord assembly 30 including a plug 32 extends from the inflator/deflator assembly 10.

Figure 2:
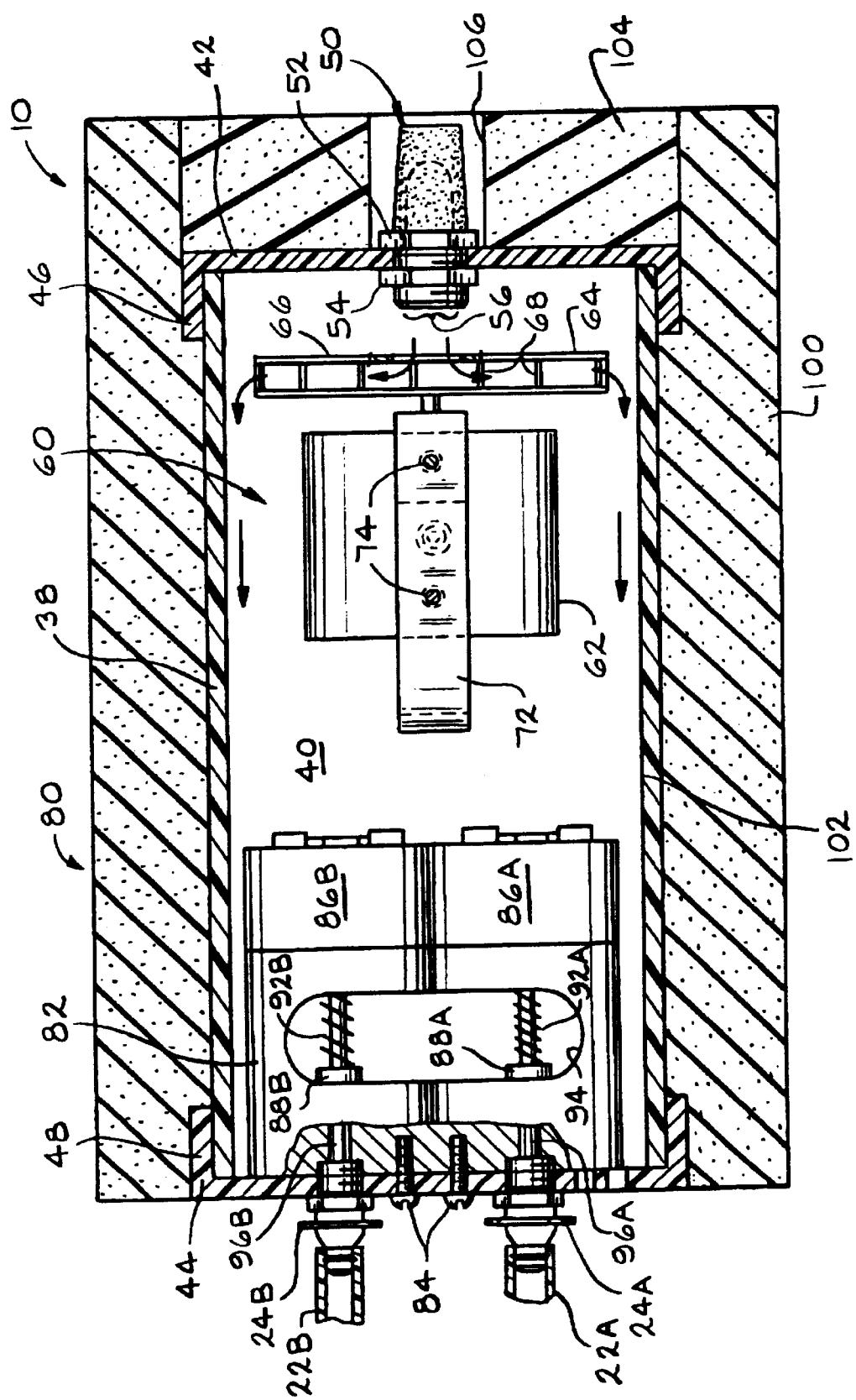
FIG. 2 is a full sectional view of an air mattress inflator/deflator assembly according to the present invention.

Turning now to FIG. 2, the air inflator/deflator assembly 10 includes an elongate, cylindrical housing 38 defining an interior 40 and having a first inlet end cap 42 and a second, outlet end cap 44. The cylindrical housing 38 as well as the end caps 42 and 44 are preferably made of PVC and may be like or similar to conventional schedule 40 PVC pipe of sufficient strength to support various components of the assembly 10 as well as possess a reasonable acoustic, i.e., sound deadening properties. In general, housings having thicker walls and made of denser material provide improved sound control but are more costly. It is envisioned that other materials, for example, compressed wood products or fiberglass reinforced plastic, to name but two, would be suitable. The end caps 42 and 44 define flanges 46 and 48, respectively, which snugly receive and grip the exterior of the cylindrical housing 38. If desired, the end caps 42 and 44 may be secured to the elongate cylindrical housing by suitable PVC adhesives or radially disposed, removable or non-removable threaded fasteners (not illustrated).

Disposed preferably centrally on the inlet end cap 42 is an intake muffler 50. The intake muffler 50 is sintered metal that is air permeable and is frusto-conical in shape. This allows maximum exterior surface area for air flow, as well as reduction of internally generated noise transfer to the ambient. The intake muffler 50 is a standard device that is often used as an exhaust muffler in compressed air systems. The intake muffler 50 which defines a large plurality of relatively small, convoluted and intersecting passageways reduces noise transmission generated by components of the air inflator/deflator assembly 10 at the inlet where, of course, it must draw air from the ambient. Similar devices such as a tube filled with wadded media or a plurality of perforated baffles, for example, will also achieve the dual goals of air flow and reduced noise transmission. The intake muffler 50 is disposed in a through opening 52 in the end cap 42 and is secured thereto by a threaded fastener such as nut 54 or similar device. The intake muffler includes a centrally disposed outlet passageway 56.

Adjacent the outlet passageway 56 of the intake muffler 50 is a motor and blower assembly 60. The motor and blower assembly 60 includes a high RPM blower motor 62 which is coupled to and drives a blower wheel 64. The blower wheel 64 includes an inlet opening 66 which is disposed adjacent the outlet passageway 56 of the intake muffler 50. A plurality of curved or radial vanes 68 direct air from the inlet opening 66 to the periphery of the blower wheel 64 when it is rotating as will be readily appreciated. The blower motor 62 is supported upon a U-shaped frame 72 which may be secured to a wall of the elongate housing 38 by suitable bolts or other threaded fasteners 74. When operating, the motor and blower assembly 60 pressurize the interior 40 of the housing 38.

Adjacent the outlet end cap 44 and secured thereto is a solenoid valve assembly 80. The solenoid valve assembly 80 includes a formed or machined base 82 which is secured to the outlet end cap 44 by a plurality of suitable fasteners 84. The base 82 positions and supports a pair of solenoid coils 86A and 86B which activate respective valve plungers 88A and 88B which are maintained in normally closed positions by a respective pair of compression springs 92A and 92B. The valve plungers 88A and 88B reside within an elongate channel 94 formed in the base 82 which communicates with the interior 40 of the elongate housing 38. The base 82 also defines a respective pair of outlet ports 96A and 96B which communicate with the respective lengths of tubing 22A and 22B through the outlet fittings 24A and 24B.

Referring now to FIGS. 1 and 2, the inflator/deflator assembly 10 also includes a foam block or surround 100. The foam surround 100 is somewhat longer than the housing 38 and defines a through opening 102 having a diameter just slightly smaller than the outside diameter of the housing 38. Accordingly, the foam surround 100 snugly receives the housing 38 and, though removable, is retained thereabout without the use of adhesives or other securement means. At the end of the foam surround 100 adjacent the intake muffler 50 is a circular foam disc 104 having an outside diameter just slightly larger than the diameter of the through passageway 102. The foam disc 104 also defines a small through passageway 106 having a diameter larger than the outside diameter of the intake muffler 50.

The foam disc 104 closes off a major portion of the otherwise open end of the foam surround 100 adjacent the inlet end cap 42 and intake muffler 50 as will be readily appreciated. The foam surround 100 and foam disc 104 are preferably made of closed cell polyurethane foam. The foam surround 100 and foam disc 104 provide noise reduction by damping the external surface of the housing 38 and inlet end cap 42 and providing a vast number of closed cells or pockets which reduce sound transmission from the housing 38. Furthermore, the foam surround 100 raises the housing 38 off any supporting surface thereby minimizing the transmission of sound to any building components that might sympathetically vibrate. For example, if the foam surround 100 were absent, while carpeting would not present a difficulty, if the housing 38 were placed directly upon a bare wood or vinyl floor covering surface, noise transmission and thus generation would be significant and likely objectionable.

It should be noted that while the foam surround 100 illustrated is square in cross section, other cross sections such as round, triangular, pentagonal, hexagonal and the like or irregular surface treatments such as projections and recesses may also be utilized. Preferably, the minimum wall thickness of the foam surround 100 will be approximately one inch. Also, the foam surround 102 may be lengthened such that a second circular disc is disposed adjacent the outlet end cap 44. However, since the outlet end cap 44 is somewhat distant from the motor and blower assembly, the solenoid valve assembly is secured to the outlet end cap 44 thereby minimizing uncontrolled diaphragm-like vibrations of the end cap 44 and, lastly, because of the number and position of the interconnecting cables and hoses, it has been found that such a second foam disc has a minimal effect on sound level reduction.

Figure 3:
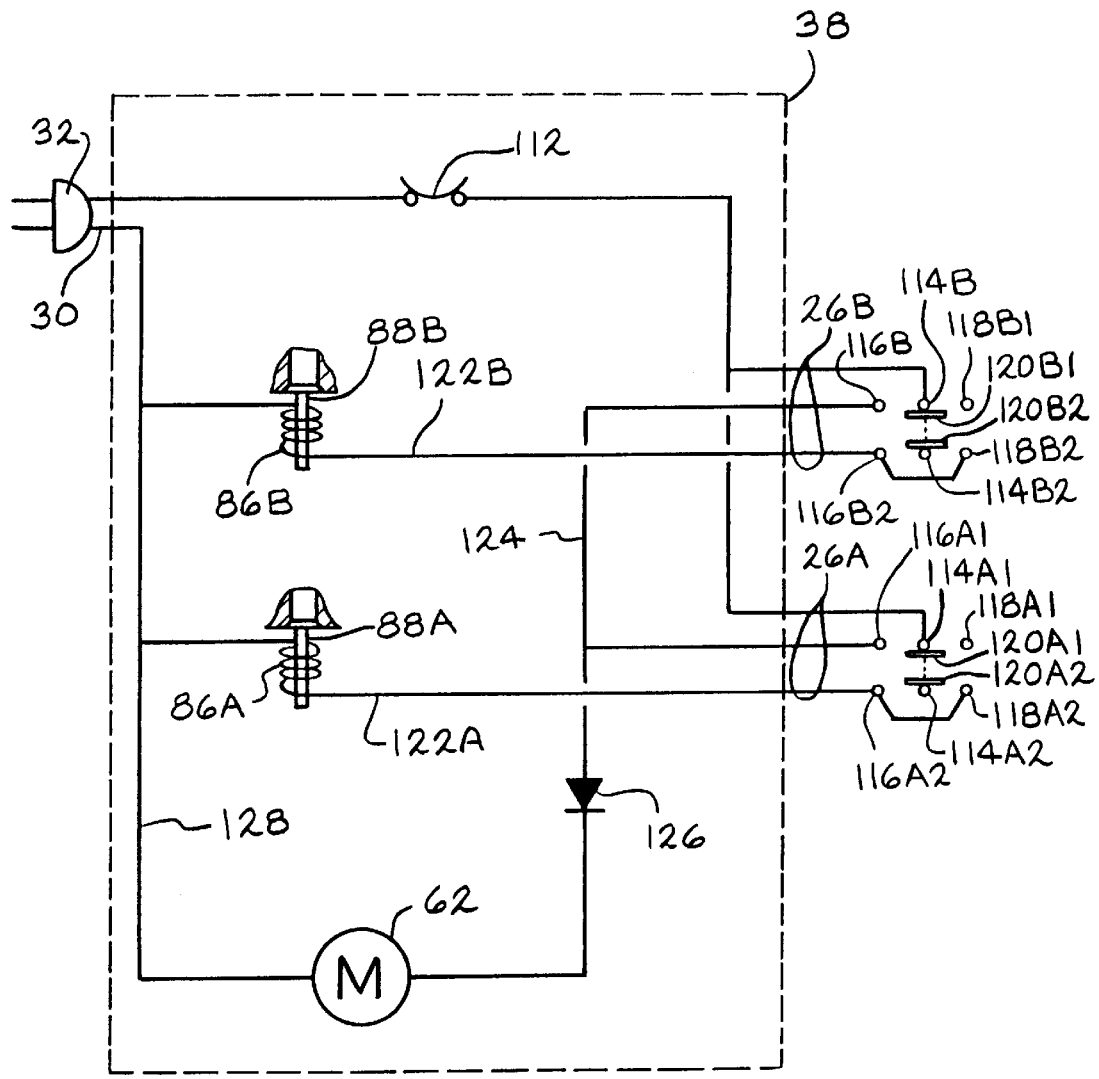
FIG. 3 is a schematic wiring diagram of an air mattress inflator/deflator assembly according to the present invention.

Turning then to FIG. 3, the electrical wiring diagram of the air inflator/deflator assembly 10 is illustrated. As noted, a conventional electrical plug 32 provides electrical energy through a multiple conductor cable 30. A thermostatic safety switch 112 disposed in the interior 38 of the elongate housing 40 opens the electrical circuit thereby inhibiting operation of all of the electrical components when the temperature within the housing 38 exceeds a preset limit. Assuming the temperature limit control 112 is closed, electricity is provided to the center or common pair of contacts 114B1 and 114B2 of the momentary contact switch 28B which is a double pole, double throw type.

The momentary contact switch 28B includes a first pair of isolated, aligned contacts 116B1 and 116B2 on one side of the center or common contacts 114B1 and 114B2 and a second pair of aligned contacts 118B1 and 118B2 on the opposite side of the center contacts 114B1 and 114B2.

A pair of sliding wipers 120B1 and 120B2 are biased by springs (not illustrated) into center, normally off positions illustrated in FIG. 3 and electrically connect the center contacts 114B1 and 114B2 to the first pair of contacts 116B1 and 116B2 when they are moved to the left or the second pair of contacts 118B1 and 118B2 when they are moved to the right, as those familiar with center off, momentary contact, double pole, double throw switches will readily appreciate.

When the sliding wipers 120B1 and 120B2 are moved to the right, the contact 118B2 is energized and a conductor 122B provides electrical energy to the solenoid valve 86B, opening it. The open solenoid valve 86B allows air under low pressure in the bladder 14B to flow back into the interior 40 of the housing 38 and exhaust through the intake muffler 50, thus lowering the pressure and reducing the firmness of the bladder 14B on one side of the air mattress 12. When the switch 28B is released, the wipers 120B1 and 120B2 are returned to the positions illustrated in FIG. 3 and the valve 86B closes, maintaining the level of air pressure and thus firmness of the bladder 14B of the air mattress 12.

When the sliding wipers 120B1 and 120B2 are moved to the left as illustrated in FIG. 3, electrical energy is provided to the contact 116B2, through the conductor 122B to the solenoid valve 86B and also to the contact 116B1 and through a conductor 124 to a diode or half-wave rectifier 126. The diode or half-wave rectifier 126 reduces the voltage applied to the blower motor 62 by 50% and thus reduces significantly its operating speed and sound generation. An electrical conductor 128 is coupled to the plug 32.

The momentary contact switch 28A includes a pair of isolated, aligned contacts 116A1 and 116A2 on one side of the center or common contacts 114A1 and 114A2 and a second set of aligned contacts 118A1 and 118A2 on the opposite side of the center contacts 114A1 and 114A2. An electrical conductor 122A connects the switch contacts 116A2 and 118A2 with the solenoid valve 86A.

Operation of the switch assembly 28A is the same as operation of the switch assembly 28B, as will be readily appreciated, except that its operation affects the pressurization and release of air from the other bladder 14B of the air mattress 12. Thus, it will be appreciated that individual control of the firmness/softness of each envelope or bladder 14A and 14B is achievable by operation of the air mattress inflator/deflator assembly 10 according to the present invention.

As noted, one of the significant design goals of the air mattress inflator/deflator assembly 10 of the present invention is reduced operating noise level relative to presently available similar products. The following Table I sets forth the results of sound level testing undertaken on various products. The sound level meter was placed 12 inches from each unit when it was operating in the inflate mode. Neither hoses nor mattresses were coupled to the devices during the sound level measurements.

TABLE I

| PRODUCT UNDER TEST | SOUND LEVEL (dbA Scale) |
|---|---|
| Competitive Product A | 88 |
| Competitive Product B | 80 |
| Sample 1 | 65 |
| Sample 2 | 68 |

Thus, in operation, an air inflator/deflator assembly 10 according to the present invention exhibits noise levels 12 to 23 db lower than currently available competitive products. This is a significant benefit and overcomes a complaint frequently raised by users of such products.

The foregoing disclosure is the best mode devised by the inventor for practicing this invention. It is apparent, however, that apparatus incorporating modifications and variations will be obvious to one skilled in the art of air mattress inflating devices. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. An air mattress inflator/deflator assembly comprising, in combination,
   a cylindrical housing having an interior and an exterior,
   a motor and blower disposed within said housing,
   an intake muffler providing communication between said exterior of said housing and said blower,
   an outlet fitting,
   at least one valve for selectively providing communication between said blower and said outlet fitting, and
   a foam surround disposed about said cylindrical housing, said foam surround defining an internal passageway adapted to receive said cylindrical housing.

2. The air mattress inflator/deflator assembly as recited in claim 1 wherein said cylindrical housing further comprises a pair of end closures.

3. The air mattress inflator/deflator assembly as recited in claim 1 wherein said intake muffler comprises air-permeable sintered metal.

4. The air mattress inflator/deflator assembly as recited in claim 1 further including at least one switch for selectively operating said valve and said motor and blower assembly.

5. The air mattress inflator/deflator assembly as recited in claim 4 wherein said valves are disposed in a common base and said base is secured to said second cap.

6. The air mattress inflator/deflator assembly as recited in claim 1 wherein said at least one switch is a three position, momentary contact switch.

7. The air mattress inflator/deflator assembly as recited in claim 1 wherein said motor and blower assembly includes an associated voltage reducing device.

8. An air mattress inflator/deflator assembly comprising, in combination
   a cylindrical housing defining an interior and having an intake muffler communicating with said interior, a motor an blower assembly disposed in said interior, at least one valve for providing selective communication between said blower and an outlet, at least one control switch for selectively operating said at least one valve and said motor and blower assembly, and a foam surround disposed about at least a portion of said cylindrical housing, said foam surround defining a passageway sized to receive said cylindrical housing.

9. The air mattress inflator/deflator assembly as recited in claim 8 wherein said cylindrical housing comprises a plastic cylinder and includes plastic end closures.

10. The air mattress inflator/deflator assembly as recited in claim 8 wherein said intake muffler comprises air-permeable sintered metal.

11. The air mattress inflator/deflator assembly as recited in claim 8 further including a second valve and wherein said valves include a dual valve base.

12. The air mattress inflator/deflator assembly as recited in claim 8 further including a foam disc disposed adjacent said intake muffler.

13. The air mattress inflator/deflator assembly as recited in claim 8 further including a second control switch and wherein said control switches are three position momentary contact switches.

14. An air mattress inflator/deflator assembly comprising, in combination, an elongate cylindrical housing having an interior, an intake end and an exhaust end, a motor and blower assembly disposed in said interior of said cylindrical housing an intake muffler, a first closure disposed at said intake end and having an opening for receiving said intake muffler, at least one outlet member, a second closure disposed at said exhaust end and having an opening for receiving said at least one outlet member, at least one valve for selectively providing communication between said blower and said outlet member, at least one control switch selectively operating said valve and said motor and blower assembly, and a foam surround defining a cylindrical passageway and disposed about said cylindrical housing.

15. The air mattress inflator/deflator assembly as recited in claim 14 wherein said cylindrical housing comprises a section of plastic, and said closures define plastic pipe caps.

16. The air mattress inflator/deflator assembly as recited in claim 14, wherein said intake muffler is air-permeable sintered metal.

17. The air mattress inflator/deflator assembly as recited in claim 14 further including a second valve operably associated with a second switch.

18. The air mattress inflator/deflator assembly as recited in claim 17 wherein said valves are disposed in a common base and said base is secured to said second cap.

19. The air mattress inflator/deflator assembly as recited in claim 14 wherein said motor and blower assembly includes an associated voltage reducing device.

20. The air mattress inflator/deflator assembly as recited in claim 14 further including a circular foam disc disposed adjacent said first closure.

\* \* \* \* \*